US009500163B2

(12) United States Patent
Pearce et al.

(10) Patent No.: US 9,500,163 B2
(45) Date of Patent: Nov. 22, 2016

(54) SERVO CONTROLLED EVAP LEAK DETECTION SYSTEM

(71) Applicant: FORD GLOBAL TECHNOLOGIES, LLC, Dearborn, MI (US)

(72) Inventors: Russell Randall Pearce, Ann Arbor, MI (US); Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 362 days.

(21) Appl. No.: 14/037,556

(22) Filed: Sep. 26, 2013

(65) Prior Publication Data

US 2015/0082866 A1 Mar. 26, 2015

(51) Int. Cl.
*G01M 3/04* (2006.01)
*F02M 25/08* (2006.01)

(52) U.S. Cl.
CPC ................................ *F02M 25/0809* (2013.01)

(58) Field of Classification Search
CPC ............ G01M 3/26; G01M 3/02; G01M 3/04; G01M 3/025; F02M 25/0809; F02M 25/0818; F02M 25/0836; F02M 25/089; F02M 25/0854
USPC ........................................................... 73/40
See application file for complete search history.

(56) References Cited

U.S. PATENT DOCUMENTS 5,010,761 A * 4/1991 Cohen .................. G01M 3/229 73/40.7
2009/0099795 A1* 4/2009 Behar ................ F02M 25/0818 702/51

* cited by examiner

*Primary Examiner* — Eric S McCall
*Assistant Examiner* — Mohammed E Keramet-Amircola
(74) *Attorney, Agent, or Firm* — Joseph E. Root

(57) ABSTRACT

A method and system for testing an evaporative emission control system for leaks. The method begins by setting a variable reference orifice to a preselected diameter. Then, a vacuum pump evacuates a reference volume in the vicinity of the variable reference orifice. The reference volume is defined by the vacuum pump, and the reference orifice. Then, after a specified evacuation time, the method determines a pressure in the reference volume. That pressure is stored as the threshold test value. The method continues by evacuating the entire EVAP system for a predetermined time. A leak can then be identified if after the evacuation, the system pressure falls at least to the threshold test value. Switching the vacuum pump between the first and second positions is accomplished with a changeover valve having parallel airways configured for evacuating a small volume to the reference orifice and also evacuating the entire EVAP system.

17 Claims, 3 Drawing Sheets

SERVO CONTROLLED EVAP LEAK DETECTION SYSTEM

TECHNICAL FIELD

Embodiments of the present disclosure generally relate to Evaporative Emission Control Systems (EVAP) for automotive vehicles, and, more specifically, to detecting leaks within EVAP systems.

BACKGROUND

Gasoline, the fuel for many automotive vehicles, is a volatile liquid subject to potentially rapid evaporation, in response to diurnal variations in the ambient temperature. Thus, the fuel contained in automobile gas tanks presents a major source of potential emission of hydrocarbons into the atmosphere. Such emissions from vehicles are termed ‘evaporative emissions’, and those vapors can be emitted vapors even when the engine is not running.

In response to this problem, industry has incorporated evaporative emission control systems (EVAP) into automobiles, to prevent fuel vapor from being discharged into the atmosphere. EVAP systems include a canister (the carbon canister) containing adsorbent carbon) that traps fuel vapor. Periodically, a purge cycle feeds the captured vapor to the intake manifold for combustion, thus reducing evaporative emissions.

Hybrid electric vehicles, including plug-in hybrid electric vehicles (HEV’s or PHEV’s), pose a particular problem for effectively controlling evaporative emissions. Although hybrid vehicles have been proposed and introduced in a number of forms, these designs all provide a combustion engine as backup to an electric motor. Primary power is provided by the electric motor, and careful attention to charging cycles can produce an operating profile in which the engine is only run for short periods. Systems in which the engine is only operated once or twice every few weeks are not uncommon. Purging the carbon canister can only occur when the engine is running, of course, and if the canister is not purged, the carbon pellets can become saturated, after which hydrocarbons will escape to the atmosphere, causing pollution.

EVAP systems are generally sealed to prevent the escape of any hydrocarbons. These systems require periodic leak detection tests to identify potential problems.

A requirement for leak testing, of course, is a standard against which to measure. In general, leak standards are expressed in terms of the maximum allowable orifice size. This field is relatively new, however, and regulatory bodies often change standards, requiring adaptation of standard leak detection procedures. Such changes often necessitate modifications in the measuring equipment, which imposes higher costs. One aspect under considerable discussion is the maximum allowable orifice size—that is, size limit for the largest allowable leak. Commonly used test equipment provides a reference orifice to establish a reference pressure level and thus any change in the maximum allowable orifice size would require changes in the reference orifice as well.

Understandably, changes to test systems, such as modifications to the orifice size, exact a toll on the manufacturers and service providers. This leaves alternatives to accommodate multiple orifices or attempts to determine the reference pressure efficiently during EVAP leak tests substantially unchallenged.

SUMMARY

One aspect of the present disclosure describes a method for testing an evaporative emission control system for leaks. The method begins by setting a variable reference orifice to a preselected diameter. Then, a vacuum pump evacuates a reference volume in the vicinity of the variable reference orifice. The reference volume is defined by the vacuum pump, the reference orifice, and fluid communication lines associated with those devices. Then, at the end of a specified evacuation time, the method determines a pressure in the reference volume. That pressure is stored as the threshold test value. The method continues by evacuating the entire EVAP system for a predetermined time. A leak can then be identified if after the evacuation, the system pressure falls at least to the threshold test value.

Another aspect of the present disclosure is in evaporative leak check system. One component of the system is at least one passage facilitating fluid communication between the outside atmosphere and the system interior. A vacuum pump is positioned in fluid communication with the passage and configured to carry out evacuating operations based on a first position and a second position. The first vacuum pump position facilitates determination of a reference pressure value or a pressure threshold value, and the second vacuum pump position facilitates determination of a system pressure value. A changeover valve switches between the first position and the second position. A a servo controlled variable reference orifice facilitates determination of the pressure threshold value.

Additional aspects, advantages, features and objects of the present disclosure are apparent from the drawings and the detailed description of the illustrative embodiments construed in conjunction with the appended claims that follow.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes a method for determining EVAP leaks in PHEVs via a variably configured orifice arrangement. To this end, a servo valve having a position interface is installed, into which, an operator can dial-in a required orifice or a passage size. In response, the servo valve replicates a conventional orifice having a corresponding diameter. Leak tests commence thereafter.

Exemplary Embodiments

The following detailed description illustrates aspects of the disclosure and its implementation. This description should not be understood as defining or limiting the scope of the present disclosure, however, such definition or limitation being solely contained in the claims appended hereto. Although the best mode of carrying out the invention has been disclosed, those in the art would recognize that other embodiments for carrying out or practicing the invention are also possible.

Figure 1A:
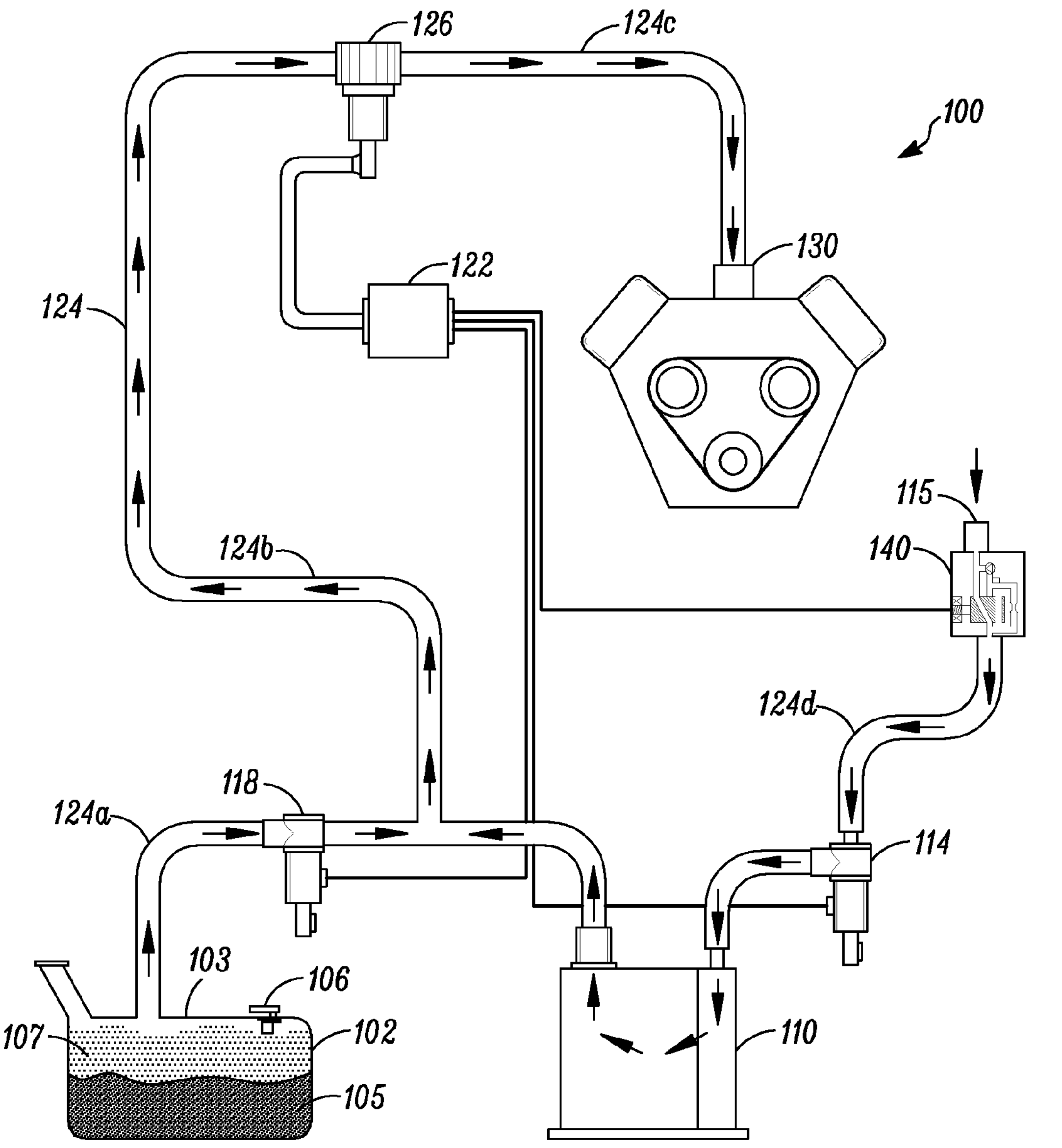
PRIOR ART FIG. 1A
FIG. 1A is a schematic view of an exemplary EVAP system installed in a PHEV, incorporated with a conventional ELCM.

FIG. 1A illustrates a conventional evaporative emissions control system 100. As seen there, the system 100 is made up primarily of the fuel tank 102, a carbon canister 110, and the engine intake manifold 130, all operably connected by lines and valves 105. It will be understood that many variations on this busy design are possible, but the illustrated embodiment follows the general practice of the art. It will be understood that the system 100 is generally sealed, with no open vent to atmosphere.

Fuel tank 102 is partially filled with liquid fuel 105, but a portion of the liquid evaporates over time, producing fuel vapor 107 in the upper portion (or "vapor dome 103") of the tank. The amount of vapor produced will depend upon a number of environmental variables, such as the ambient temperature. Of these factors, temperature is probably the most important, given the temperature variation produced in the typical diurnal temperature cycle. For vehicles in a sunny climate, particularly a hot, sunny climate, the heat produced by leaving a vehicle standing in direct sunlight can produce very high pressure within the vapor dome 103 of the tank 102. A fuel tank pressure transducer (FTPT) 106 monitors the pressure in the fuel tank vapor dome 103.

Vapor lines 124 operably join various components of the system. One, line 124*a*, runs from the fuel tank 102 to carbon canister 110. A normally closed fuel tank isolation valve (FTIV) 118 regulates the flow of vapor from fuel tank 102 to the carbon canister 110, so that flows normally freely permitted, so that the carbon pellets can adsorb the vapor generated by evaporating fuel. Vapor line 124*b* joins line 124*a* in a T intersection beyond FTIV 118, connecting that line with a normally closed canister purge valve (CPV) 126. Line 124*c* continues from CPV 126 to the engine intake manifold 130. CPV 126 is controlled by signals from the powertrain control module (PCM) 122, which also controls FTIV 118.

Canister 110 is connected to ambient atmosphere at vent 115, through a normally closed canister vent valve (CPV) 114. Vapor line 124*d* connects that 115 in canister 110.

Powertrain Control Module (PCM 122) may include a controller (not shown) of a known type connected both sensors, such as FTPT 106, as well as active control components, such as CCV 114. Connections may carry to other sensors as well. The controller may be of a known type, forming one part of the hardware of the said system, and may be a microprocessor based device that includes a central processing unit (CPU) for processing incoming signals from known source. The controller may be provided with volatile memory units, such as a RAM and/or ROM that function along with associated input and output buses. Further, the controller may also be optionally configured as an application specific integrated circuit, or may be formed through other logic devices that are well known to the skilled in the art. More particularly, the controller may be formed either as a portion of an existing electronic controller, or may be configured as a stand-alone entity.

During normal operation, FTIV 118, CPV 126, and CVV 114 are all closed. That configuration retains vapor within the fuel tank 102. Periodically, FTIV 118 is opened, allowing vapor to flow into canister 110. There, carbon pellets can adsorb fuel vapor.

To purge the canister 110, FTIV 118 is closed, and valves 126 and 114 are opened. It should be understood that this operation is only performed when the engine is running, which produces a vacuum at intake manifold 130. That vacuum causes an airflow from ambient atmosphere through vent 115, canister 110, and CPV 126, and then onward into the intake manifold 130. As the airflow passes through canister 110, it entrains fuel vapor from the carbon pellets. The fuel vapor mixture then proceeds to the engine, where it is mixed with the primary fuel/air flow to the engine for combustion.

Evacuation Level Check Monitor (ELCM 140), is typically installed near the vent 115, and is operably connected to the PCM 122. Other arrangements may be contemplated. ELCM 140 can be a component available and known to the art for performing EVAP leak checks, such as the ELCM manufactured by Denso Corporation™. A detailed ELCM layout and working principle is set out in FIGS. 1B, 1C, and 1D. That layout includes a vacuum pump 142, an absolute pressure sensor 144, a Changeover Valve (COV 146), and a reference orifice 148. Vacuum pump 142 evacuates the EVAP system for leak testing, under control of PCM 122.

Figure 1B:
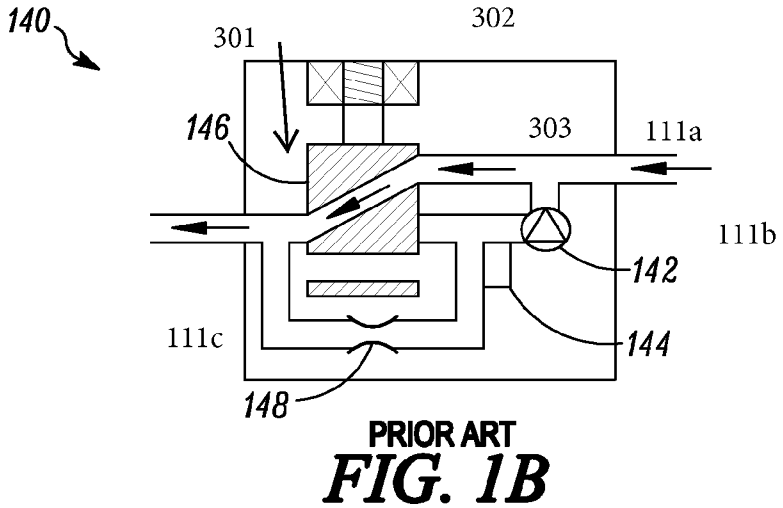
PRIOR ART FIG. 1B
FIGS. 1B, 1C, and 1D, are schematics describing the working of an exemplary ELCM.
Figure 1C:
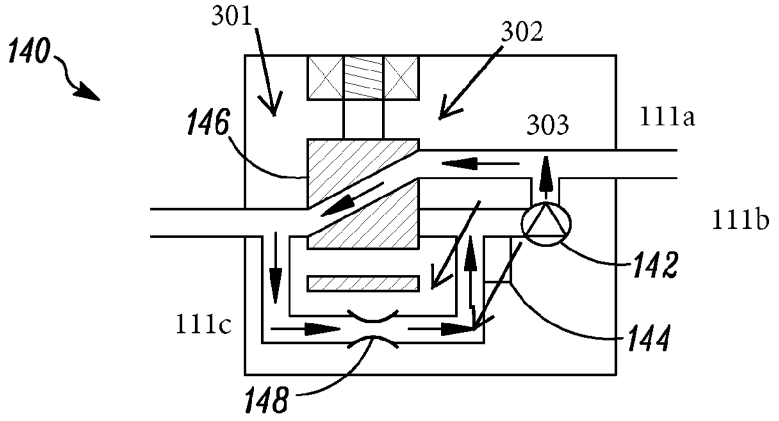
PRIOR ART FIG. 1C
Figure 1D:
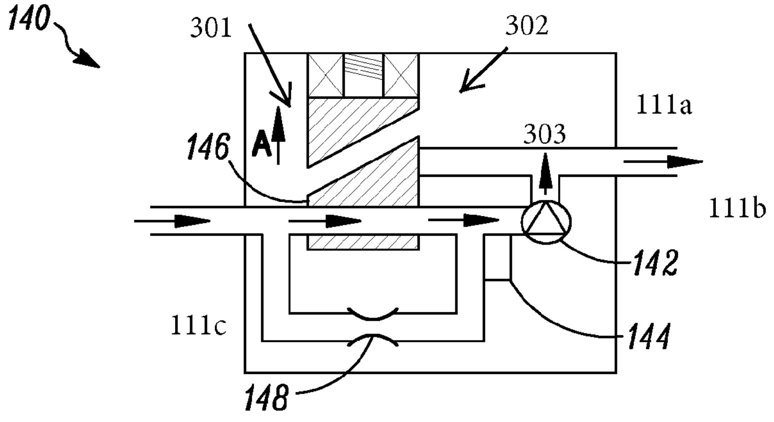
PRIOR ART FIG. 1D

FIGS. 1B, 1C, and 1D schematically illustrate ELCM 140. This device includes two input/output connections. The first connects to fluid communication line 124*d*, which runs to canister 110. A second connection provides a vent to atmosphere through system vent 115. Within the device, three possible airflow paths are provided, as selected by a solenoid 302. That device has a solenoid body 301, a generally cylindrical body having two flow paths formed through it: a vertically oblique path and a horizontal path. Solenoid 302 moves between a de-energized position, illustrated in FIG. 1B, in which solenoid body 301 extends to a maximum extent downward into ELCM 140, and an energized position, seen in FIG. 3B. In the latter position, solenoid body 301 is drawn upward toward the windings of solenoid 302.

Of the flow paths within ELCM 140, airflow path 111*a* extends from a position adjacent solenoid 302 to system vent 310. This airflow path is positioned in alignment with one outlet of the oblique flow path when solenoid 302 is not energized.

Airflow path 111*b* runs from the junction with fluid communication line 318, to a junction with airflow path 111*a*. This flow path is interrupted by solenoid 302, and the ends thus formed in flow path 111*b* are positioned in alignment with the horizontal path when solenoid 302 is energized. Additionally, a three-way valve 303 is positioned in flow path 111*b* between solenoid 302 and the junction with path 111*a*. Valve 303 can be open, closed, or placed in fluid flow with pump 142.

Airflow path 111*c* has a general U-shape, straddling solenoid body 301, with both ends opening onto airflow path 111*b* on both sides of solenoid body 301. An orifice 148, having a size that can be selected to accommodate various regulatory requirements, such as 0.020", is inserted into flow path 111*c*.

In the de-energized state shown in FIG. 1B, the oblique path joins flow path 111*a* and 111*b*. In a situation in which CPV 122 is closed, operation of pump 157, together with the positioning of valve 303 to connect pump 142 to flow path 111*b*, routes the airflow through orifice 148.

The energized state of solenoid 302, shown in FIG. 1D, pulls solenoid body 301 upward, so that the horizontal path completes the straight-through channel of path 111*b*. When valve 303 is open, airflow path 111*b* provides a ready flow path to atmosphere.

The purpose of reference orifice 148 is to simulate the effect of a leak having exactly the same size as the reference orifice. When the system is evacuated through a reference orifice, the resulting vacuum level represents the level that can be achieved with a leak having the size of the reference orifice in the system. Thus, if the maximum allowable orifice size for a given regulatory jurisdiction is 0.020", then evacuating the system through the reference orifice will establish a reference vacuum level. As noted, frequent changes in EVAP leak regulations lead to costly modifications to standard testing procedures. Here, the orifice holds maximum potential for a change.

Figure 2:
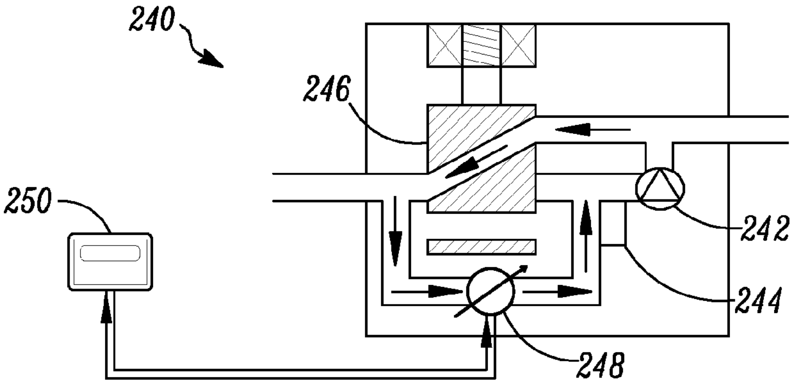
FIG. 2 is a schematic of an ELCM according to the present disclosure.

Turning to FIG. 2, an exemplary embodiment of the present disclosure describes a variable reference orifice 248, size-controlled by a servomechanism. In principle, a servomotor provides a positional control capability to an operator, thereby varying the orifice size as demanded by the applicable standards. Other valve types, however, that apply hydraulic, pneumatic, or magnetic principles, are available, and thus, may be employed.

COV 246, vacuum pump 242, and pressure sensor 244 operate as described above. The reference orifice 248 employed here, however, may be set to a number of different orifice sizes. A servo control system 250, selected from those known and available to the art, allows an operator to set the reference orifice size.

Figure 3:
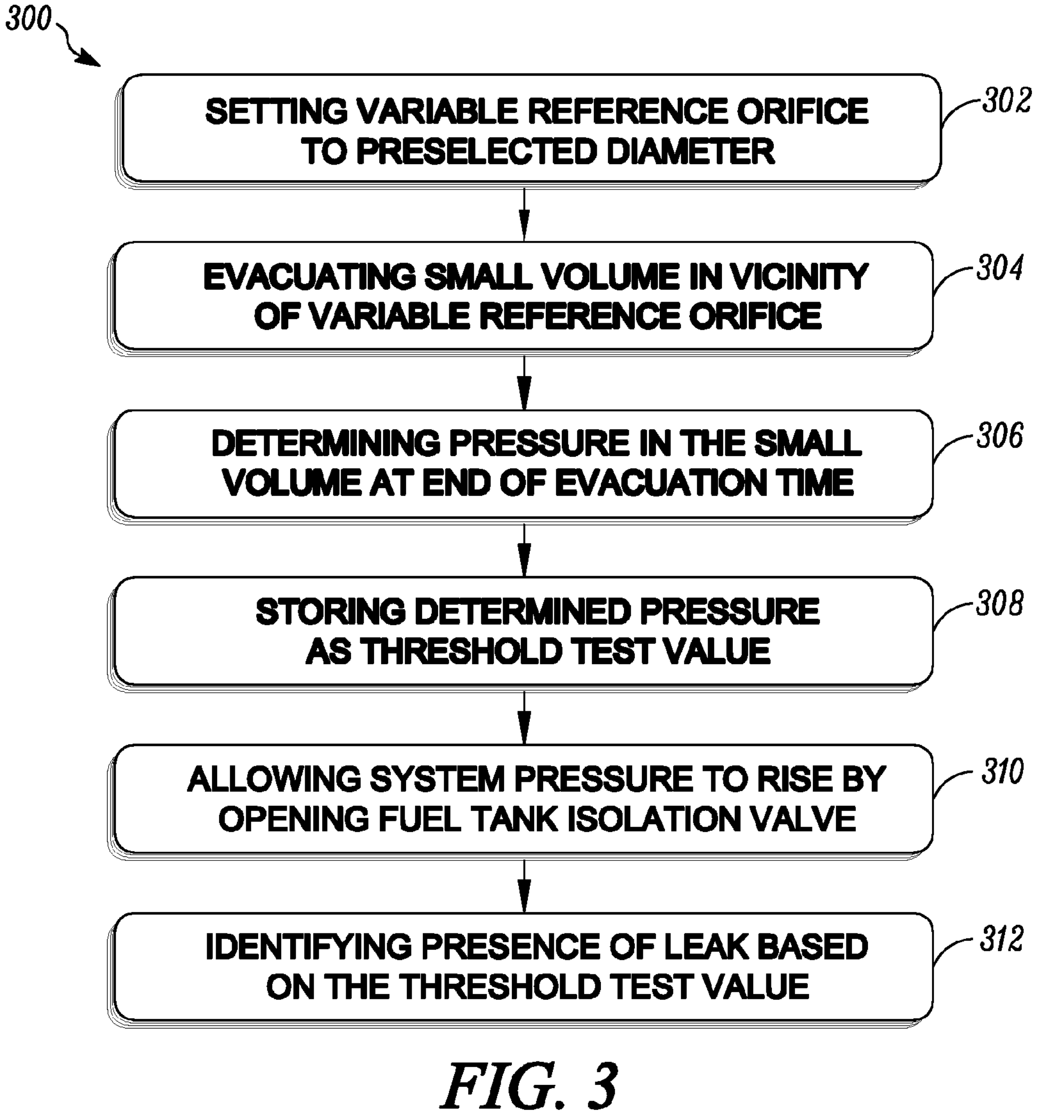
FIG. 3 is a flowchart illustrating an exemplary method to carry out an EVAP leak diagnosis in vehicles, according to the present disclosure.

FIG. 3 sets out a method 300 for implementing EVAP system leak detection using a variable orifice. At a first step 302, an operator may set a variable reference orifice to a preselected diameter, employing a suitable interface. That preselect diameter varies according to applicable regulatory requirements. Other factors, known to those in the art, may necessitate other variations. It should be noted that this step may occur before the vehicle is sold, either at the assembly plant or at a dealer's maintenance facility. A first setting can be employed at the time the vehicle is manufactured or sold, with the orifice setting based upon regulations in force at that time. If regulations change at some point after that, the orifice size can be changed easily and conveniently by a service technician.

Next, at step 304, the vacuum pump 242 evacuates a reference volume in the variable reference orifice's vicinity. In the illustrated embodiment, ELCM 240 provides a readily accessible and reasonably sized reference volume for evacuation. The evacuation is carried on for a predetermined time, drawing and through the reference orifice 248 to simulate a leak at the same size.

At step 306, the pressure sensor 244 senses the pressure within the reference volume and feeds that to PCM 122. In a following step 308, the PCM 122 stores that information as the reference threshold value.

Then, PCM 122 initiates the full leak test, starting by energizing the COV 246. The solenoid 302 activates, pulling solenoid body 301 upward (arrow A, FIG. 1D) to establish a direct passage between the system's interior and outside atmosphere. Then, FTIV 118 and CCV 114 are opened, so that the entire EVAP system is subject to evacuation. CPV 126 remains closed, but the canister 110 and fuel tank 102 and associated communication lines are evacuated The evaluation cycle requires about two to 15 minutes for the vacuum level to stabilize. Once stable vacuum is reached, PCM 122 compares the attained vacuum level against the vacuum level when the reference check was performed. If any system leaks do not aggregate to the sized to which the variable reference orifice 248 is set, then pressure level at the end of the evacuation cycle will be at or below the reference level. Failure to achieve the reference level indicates the presence of a leak greater than the size of the reference orifice . . . .

Differing configurations of the system 100 may not restrict the disclosed ELCM's usability as through known mechanisms someone skilled in the art may form embodiments apart from those described. In effect, despite the system's customization and/or variation to any known extent, those skilled in art can ascertain ways to incorporate the servo control mechanism, described so far, into ELCM 240. Similarly, variations to the ELCM 240 may be contemplated.

The discussed system 100 may be applied to a variety of other applications as well. For example, any similar application, requiring the adherence to stringent emission norms may make use of the disclosed subject matter. Accordingly, it may be well known to those in the art that the description of the present disclosure may be applicable to a variety of other environments as well, and thus, the environment disclosed here must be viewed as being purely exemplary in nature.

Further, the system 100 discussed so far is not limited to the disclosed embodiments alone, as those skilled in the art may ascertain multiple embodiments, variations, and alterations, to what has been described. Accordingly, none of the embodiments disclosed herein need to be viewed as being strictly restricted to the structure, configuration, and arrangement alone. Moreover, certain components described in the application may function independently of each other as well, and thus none of the implementations needs to be seen as limiting in any way.

Accordingly, those skilled in the art will understand that variations in these embodiments will naturally occur in the course of embodying the subject matter of the disclosure in specific implementations and environments. It will further be understood that such variations will fall within the scope of the disclosure. Neither those possible variations nor the specific examples disclosed above are set out to limit the scope of the disclosure. Rather, the scope of claimed subject matter is defined solely by the claims set out below.

We claim:

1. A method for testing an evaporative emission control system for leaks, comprising setting a continuously variable reference orifice to a preselected diameter;

evacuating a reference volume in the vicinity of the variable reference orifice, using a vacuum pump, the reference volume being defined by the vacuum pump, the reference orifice, and fluid communication lines associated with those devices;

determining a pressure in the reference volume at the end of a specified evacuation time;

storing the determined pressure as the threshold test value;

evacuating the system for a predetermined time; and identifying the presence of a leak if, after the evacuation, the system pressure falls at least to the threshold test value.

2. The method of claim 1, wherein setting a variable reference orifice to a preselected diameter is performed by servo control.

3. The method of claim 1, wherein the variable reference orifice includes an interface, into which required orifice sizes are fed-in.

4. The method of claim 1, wherein determining the pressure is accomplished through a pressure sensor.

5. The method of claim 1 further comprising a Changeover Value (COV) suitably placed within the fluid communication lines, and is configured to alter two fluid flow paths/directions.

6. The method of claim 5, wherein the pressure sensor, fluid communication lines, vacuum pump, and COV, constitute an Evaporation Level Check Monitor (ELCM).

7. The method of claim 6, wherein the determined pressure is stored within a memory in a Powertrain Control Module (PCM), operably connected to the ELCM.

8. An leak check system in an evaporative emission control system, comprising:

at least one passage facilitating a fluid communication between an outside atmosphere and a system interior;

a reference volume defined by a vacuum pump, a reference orifice, and fluid communication lines associated with those devices within the evaporative emission control system;

a vacuum pump in fluid communication with at least one passage and configured to carry out evacuating operations based on a first position and a second position, wherein in the first position the vacuum pump facilitates determination of a reference pressure value or a pressure threshold value within the reference volume, and in the second position the vacuum pump facilitates determination of a system pressure value;

a changeover valve to switch between the first position and the second position; and a servo controlled continuously variable reference orifice facilitating determination of the pressure threshold value.

9. The system of claim 8, wherein the servo controlled orifice includes an interface to feed in the orifice size.

10. The system of claim 8, wherein determination of reference pressure is facilitated via a pressure sensor disposed within the evaporative leak check system.

11. The system of claim 8, wherein determination of the system pressure value is facilitated through a pressure transducer disposed suitably within the system.

12. A method for diagnosing leaks in an evaporative emission control system, comprising setting a continuously variable reference orifice to a preselected diameter, that setting being enabled by a servo control;

evacuating a reference volume in the vicinity of the variable reference orifice, using a vacuum pump, the reference volume being defined by the vacuum pump, the reference orifice, and associated fluid communication lines;

determining a pressure in the reference volume at the end of a specified evacuation time;

storing the determined pressure as the threshold test value;

evacuating the system for a predetermined time; and identifying the presence of a leak if, after the evacuation, the system pressure falls at least to the threshold test value.

13. The method of claim 12, wherein the variable reference orifice includes an interface, into which required orifice sizes are fed-in.

14. The method of claim 12, wherein determining the pressure is facilitated through a pressure sensor.

15. The method of claim 12 further comprising a Changeover Value (COV) suitably placed within the fluid communication lines, and is configured to provide two fluid flow paths.

16. The method of claim 15, wherein an assembly of the pressure sensor, fluid communication lines, vacuum pump, and the COV, establishes an Evaporation Level Check Monitor (ELCM).

17. The method of claim 16, wherein the determined pressure is stored within a memory in a Powertrain Control Module (PCM), operably connected to the ELCM.

* * * * *